United States Patent
Li et al.

(10) Patent No.: US 9,955,039 B2
(45) Date of Patent: Apr. 24, 2018

(54) IMAGE PROCESSING DEVICE, COPY APPARATUS AND COPY METHOD WITH IMAGE SHIFTING AND FILLING FUNCTIONS

(71) Applicant: AVISION INC., Hsinchu (TW)

(72) Inventors: Chen-Chang Li, Miaoli County (TW); Cheng Chen Tseng, Hsinchu County (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 15/630,326

(22) Filed: Jun. 22, 2017

(65) Prior Publication Data

US 2018/0013917 A1    Jan. 11, 2018

(30) Foreign Application Priority Data

Jul. 6, 2016 (TW) ............................. 105121313 A (51) Int. Cl.
  *G06F 3/12* (2006.01)
  *H04N 1/387* (2006.01)
  *H04N 1/00* (2006.01)
  *H04N 1/04* (2006.01)

(52) U.S. Cl.
  CPC ....... *H04N 1/3872* (2013.01); *H04N 1/00087* (2013.01); *H04N 1/00761* (2013.01); *H04N 1/3876* (2013.01); *H04N 2201/0094* (2013.01)

(58) Field of Classification Search
  CPC ............. H04N 1/3872; H04N 1/00087; H04N 1/00761; H04N 1/3876; H04N 1/3878; H04N 1/3935; H04N 2201/0094

USPC ......... 358/1.1–1.18, 474; 382/135, 137, 165, 382/203

See application file for complete search history.

(56) References Cited

U.S. PATENT DOCUMENTS

| | | | |
|---|---|---|---|
| 6,519,364 B1 | 2/2003 | Hiraishi | |
| 7,418,125 B2 * | 8/2008 | Miyashita | G06K 9/3233 382/151 |
| 2005/0024406 A1 * | 2/2005 | Otsuki | B41J 11/008 347/14 |
| 2011/0096380 A1 | 4/2011 | Hanayama | |

(Continued)

FOREIGN PATENT DOCUMENTS

| | | |
|---|---|---|
| CN | 102043363 A | 5/2011 |
| TW | 356544 B | 4/1999 |
| TW | 201616851 A | 5/2016 |

*Primary Examiner* — Gabriel Garcia (57) ABSTRACT

An image processing device comprises a receiving port, a processor and an output port. The receiving port receives old image data from a peripheral device. The old image data has partial positioning mark data corresponding to a portion of a positioning mark of a document, and partial main image data corresponding to a partial main image of a portion of a main image of the document. The processor electrically connected to the receiving port shifts the partial main image by a calibration distance in a calibration direction to a standard position of a typesetting page according to the partial positioning mark data and the partial main image data, and adds a predetermined image to one side or neighboring two sides of the partial main image to generate new image data. The output port electrically connected to the processor outputs the new image data. Copy apparatus and method are also provided.

15 Claims, 10 Drawing Sheets

(56) References Cited

U.S. PATENT DOCUMENTS

2011/0194127 A1\* 8/2011 Nagakoshi ........... H04N 1/0044
  358/1.9
2016/0127605 A1   5/2016 Sheng et al.
2017/0104888 A1\* 4/2017 Nomura ............... H04N 1/3878

\* cited by examiner

IMAGE PROCESSING DEVICE, COPY APPARATUS AND COPY METHOD WITH IMAGE SHIFTING AND FILLING FUNCTIONS

This application claims priority of No. 105121313 filed in Taiwan R.O.C. on Jul. 6, 2016 under 35 USC 119, the entire content of which is hereby incorporated by reference.

BACKGROUND OF THE INVENTION

Field of the Invention

This disclosure relates to an image processing device, a copy apparatus and a copy method, and more particularly to an image processing device, a copy apparatus and a copy method with image shifting and filling functions.

Description of the Related Art

When a conventional copier is performing copying, an original is firstly scanned, and then the scanned result is reproduced on a medium. The copier performs the copying according to scan boundaries. If the scan boundaries have errors or fluctuations, the reproduced result has the position deviation. Consequently, when the original (first generation) is copied at the first time, a first error is generated on the second generation of copied document. When the second generation of copied document is copied again, a second error is generated on the third generation of copied document. The accumulated error is the sum of the first error and the second error. Thus, the accumulated error generated after multiple generations of copying processes are performed is very large, or even some contents may be cropped off. More particularly, when the user wants to print other contents on the multi-generation of copied document, the printed result may have errors.

In addition, when the conventional copier with an automatic feeder is performing the copying, an original width adjuster on a supply tray can be used to restrict the width of the original to prevent the fed document from skewing and to completely reproduce the image content. However, when the user does not correctly use the original width adjuster or when the user wants to copy a stack of originals with different widths, such the copy method may encounter problems. For example, the first original is completely transported past a scan window, so its contents may be completely acquired. However, when the second original is shifted rightward by a distance, its contents cannot be completely acquired and thus copied, and the user obtains the strange reproduced result.

SUMMARY OF THE INVENTION

It is therefore an object of this disclosure to provide an image processing device, a copy apparatus and a copy method with image shifting and filling functions, so that the copied document may have the positional configuration substantially the same as that of the original.

To achieve the above-identified object, this disclosure provides an image processing device comprising a receiving port, a processor and an output port. The receiving port receives old image data from a peripheral device. The old image data has partial positioning mark data corresponding to a portion of a positioning mark of a document, and partial main image data corresponding to a partial main image of a portion of a main image of the document. The processor electrically connected to the receiving port shifts the partial main image by a calibration distance in a calibration direction to a standard position of a typesetting page according to the partial positioning mark data and the partial main image data, and adds a predetermined image to one side or neighboring two sides of the partial main image to generate new image data. The calibration direction is contained in directions from the predetermined image to the positioning mark. The output port electrically connected to the processor outputs the new image data.

This disclosure further provides a copy apparatus comprising a peripheral device and an image processing device. The peripheral device scans a document to obtain old image data. The old image data has partial positioning mark data corresponding to a portion of a positioning mark of the document, and partial main image data corresponding to a partial main image of a portion of a main image of the document. The image processing device connected to the peripheral device receives the old image data, shifts the partial main image by a calibration distance in a calibration direction to a standard position of a typesetting page according to the partial positioning mark data and the partial main image data, and adds a predetermined image to one side or neighboring two sides of the partial main image to generate new image data. The calibration direction is contained in directions from the predetermined image to the positioning mark, and the peripheral device further receives the new image data and prints the new image data on a medium.

This disclosure also provides a copy method used in a copy system or a copy apparatus, and the copy method comprises steps of: scanning a document to obtain old image data, wherein the old image data has partial positioning mark data corresponding to a portion of a positioning mark of the document, and partial main image data corresponding to a partial main image of a portion of a main image of the document; shifting the partial main image by a calibration distance in a calibration direction to a standard position of a typesetting page according to the partial positioning mark data and the partial main image data; adding a predetermined image to one side or neighboring two sides of the partial main image to generate new image data, wherein the calibration direction is contained in directions from the predetermined image to the positioning mark; and printing the new image data on a medium.

With the above-mentioned aspects, the position-shifted image of the original can be pulled back to the normal position while the lost image caused by pulling back can be filled with a new image when the original is being copied. Thus, one stack of reproduced documents may have substantially the same typesetting pages to satisfy the neat requirement without damaging the important data. More particularly, when this stack of reproduced documents is bound into a book with three blank side portions being cut off, the user may feel the consistency of the bound pages of the book without the messy feeling when the user continuously turns over the pages.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

Referring to FIGS. 1 to 4, a copy apparatus 1 according to the first embodiment of this disclosure comprises a peripheral device 100 and an image processing device 200. The image processing device 200 comprises a receiving port 210, a processor 220, an output port 240 and a storage 230. The image processing device 200 comprises, for example but without limitation to, a computer, a server or a multi-function peripheral. The peripheral device 100 may be a printer, a copier, a multi-function peripheral with a scanner and a printer, a fax machine or the like.

Figure 1:
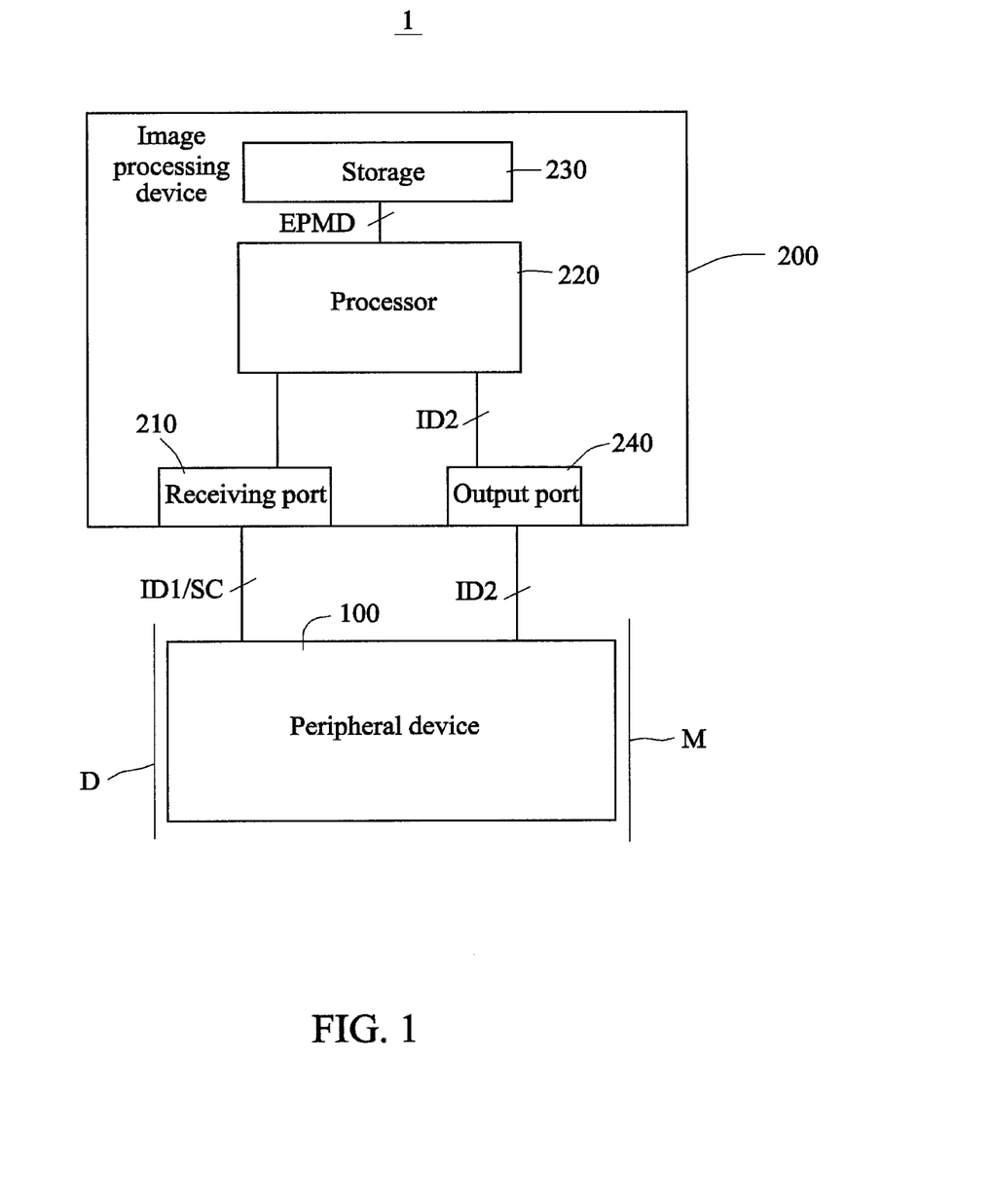
FIG. 1 is a schematic view showing a copy apparatus according to a first embodiment of this disclosure.
Figure 2:
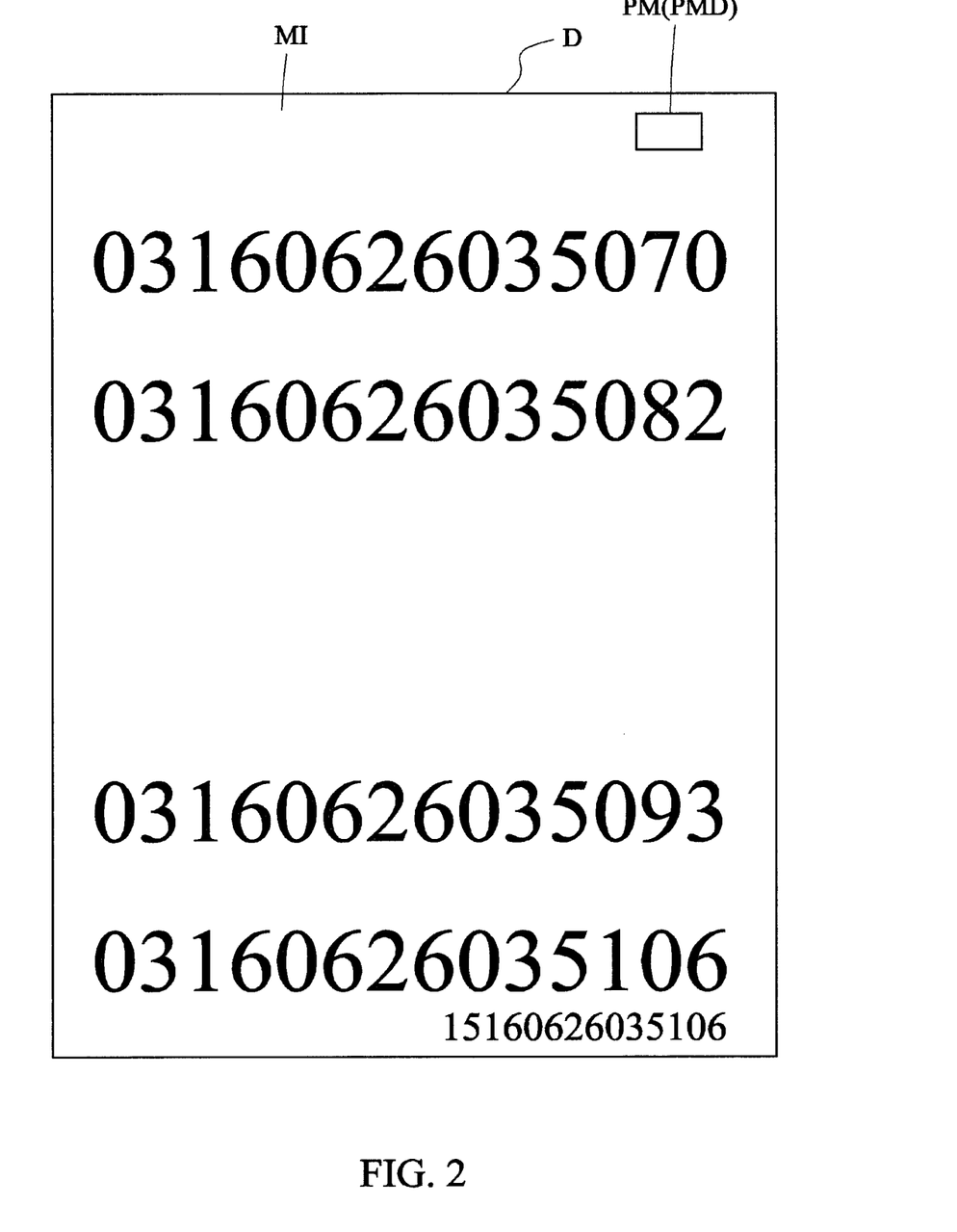
FIG. 2 is a schematic view showing an original document.
Figure 3:
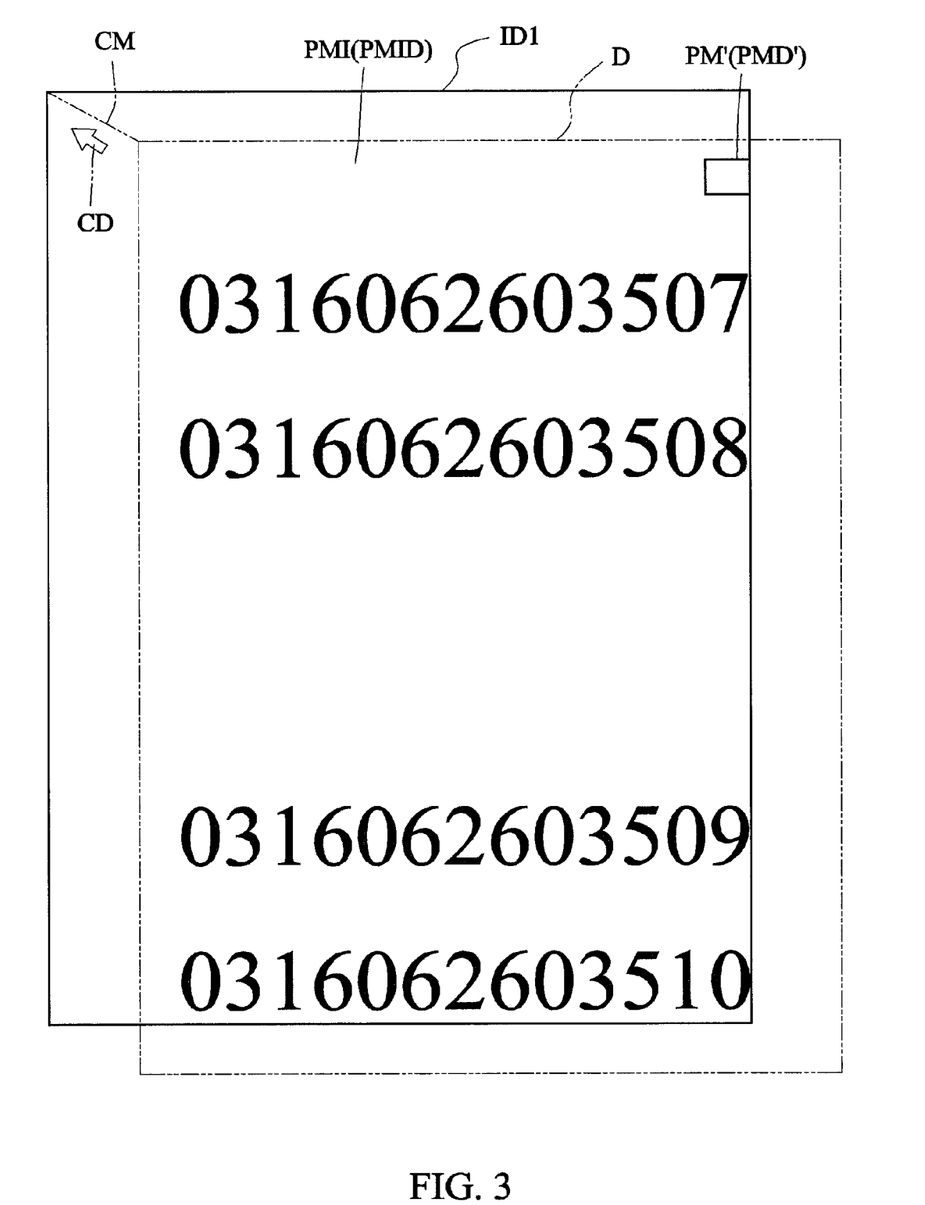
FIG. 3 is a schematic view showing old image data.

The receiving port 210 receives old image data ID1 from the peripheral device 100. The old image data ID1 has partial positioning mark data PMD' corresponding to a portion PM' of a positioning mark PM of a document D (positioning mark data PMD corresponds to the whole positioning mark PM), and partial main image data PMID corresponding to a partial main image PMI of a portion of a main image MI of the document D. That is, the old image data ID1 may be only a portion of the main image MI because an original width adjuster is not correctly or properly used and when different widths of originals are transported and scanned or the scan start point of the lengthwise direction of the original has an error. In another example, the receiving port 210 may also receive a compensation requesting signal SC from the peripheral device 100. That is, the peripheral device 100 automatically outputs the compensation requesting signal SC when the peripheral device 100 needs to enter the compensation mode, so that the image processing device 200 knows that the following processes need to be performed. In this embodiment, a rectangular block represents the positioning mark without limiting this disclosure thereto because any pattern or text that can be positioned may function as the positioning mark.

Figure 4:
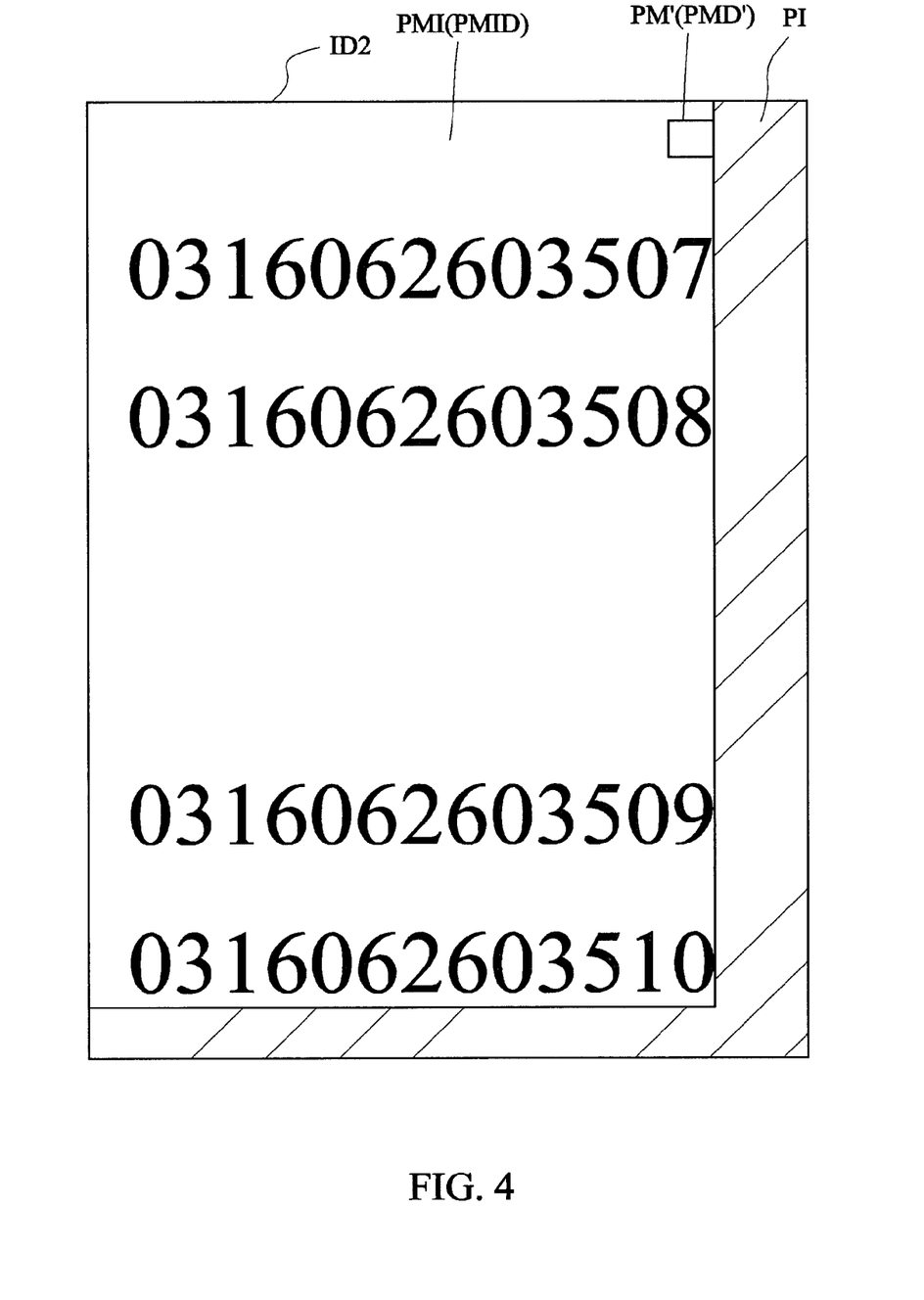
FIG. 4 is a schematic view showing new image data.

The processor 220 electrically connected to the receiving port 210 shifts the partial main image PMI to a standard position of a typesetting page by a calibration distance CM in a calibration direction CD according to the partial positioning mark data PMD' and the partial main image data PMID, and adds a predetermined image PI to one side or neighboring two sides of the partial main image PMI to generate new image data ID2, wherein the predetermined image PI is added to two sides of the partial main image PMI in FIG. 4, but the predetermined image PI is added to one side of the partial main image PMI when the calibration direction CD is the horizontal or vertical direction. The predetermined image PI comprises an image selected from a group consisting of a blank image, a gray image and a text image (an image containing a text or texts). In one example, instead of the non-black image, the blank image is used so that the user feels no loss, and the copying material, such as toner, ink or the like, can be saved. In another example, a gray image or text image (texts) may be used to inform the user that the reproduced result has been calibrated.

The calibration direction CD is contained in various directions from the predetermined image PI to the positioning mark PM. That is, in the example of FIG. 4, the calibration direction CD is from the lower right portion to the upper left portion. The processor 220 can determine the calibration direction CD and the calibration distance CM according to the partial positioning mark data PMD'.

The output port 240 electrically connected to the processor 220 outputs the new image data ID2. The receiving port 210 and the output port 240 may be the interface, such as USB interface, network interface or the like, which can achieve the electrical connection, or an ordinary direct electrical connection interface (direct bonding or the connection through electrical connectors). In one embodiment, the receiving port 210 and the output port 240 may be combined or integrated together to from an integrated port.

In this embodiment, the processor 220 further outputs the new image data ID2 through the output port 240 to the peripheral device 100. The peripheral device 100 may store or transmit the new image data ID2 or print the new image data ID2 on a medium M.

The storage 230 electrically connected to the processor 220 stores standard position data corresponding to standard positions of multiple sets of template mark data EPMD comprising the positioning mark data PMD (partial positioning mark data PMD'). That is, a look-up table is provided so that the processor 220 can automatically perform the comparison and determination by looking up the look-up table. Thus, the processor 220 can find the standard position data (e.g., the position data of one corner) of the partial positioning mark data PMD from the multiple sets of template mark data EPMD, and determine the calibration direction CD and the calibration distance CM according to the standard position data and the partial positioning mark data PMD'. The final object is to pull the partial main image PMI and the positioning mark PM back to the original positions to prevent the extremely large offsets from being generated after multiple generations of copying processes.

With the above-mentioned embodiment, only partial images of the document D and the medium M are the same. For example, the rightmost digits of four rows of large number strings on the typesetting page of FIG. 4 have been removed, all digits of the bottommost number string have been removed. When the predetermined image PI is presented by the white image without the frame, the user may see the typesetting pages of FIGS. 2 and 4 as substantially the same. In the shown example, although some of the copied image data gets lost, the lost image data is not the important data (e.g., frame lines or the ordinary information (e.g., form code PTO/AIA/80 or the like) outside the frame in another embodiment. The method of this disclosure can improve the copy result.

It is worth noting that the image processing device 200 and the peripheral device 100 may be implemented separately, and may also be combined or integrated into the integrated copy apparatus 1. That is, the image processing device 200 and the peripheral device 100 are disposed in the casing of the copy apparatus 1, and the associated data or records can be stored only in the copy apparatus 1, or be transmitted to a cloud apparatus through the network. Thus, the peripheral device 100 finally receives the new image data ID2, and prints the new image data ID2 on the medium M to complete the copy process.

Figure 5:
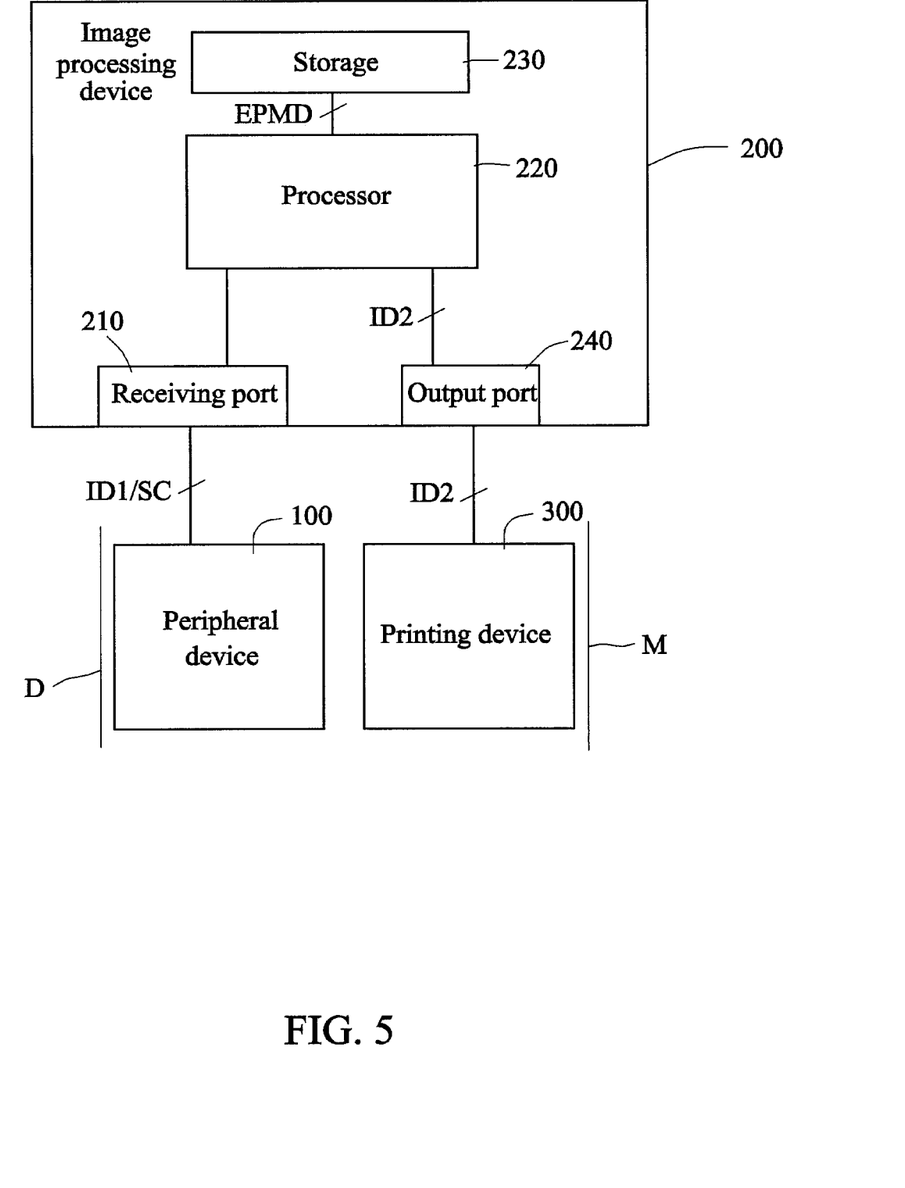
FIG. 5 is a schematic view showing a copy apparatus according to a second embodiment of this disclosure.

FIG. 5 is a schematic view showing a copy apparatus according to a second embodiment of this disclosure. As shown in FIG. 5, this embodiment is similar to the first embodiment except for the difference that the new image data ID2 is outputted to a printing device (e.g., printer) 300 different from the peripheral device 100, and the printing device 300 prints the new image data ID2 on the medium M. In this case, the compensation requesting signal SC can specify or designate the information of the printing device 300.

Figure 6:
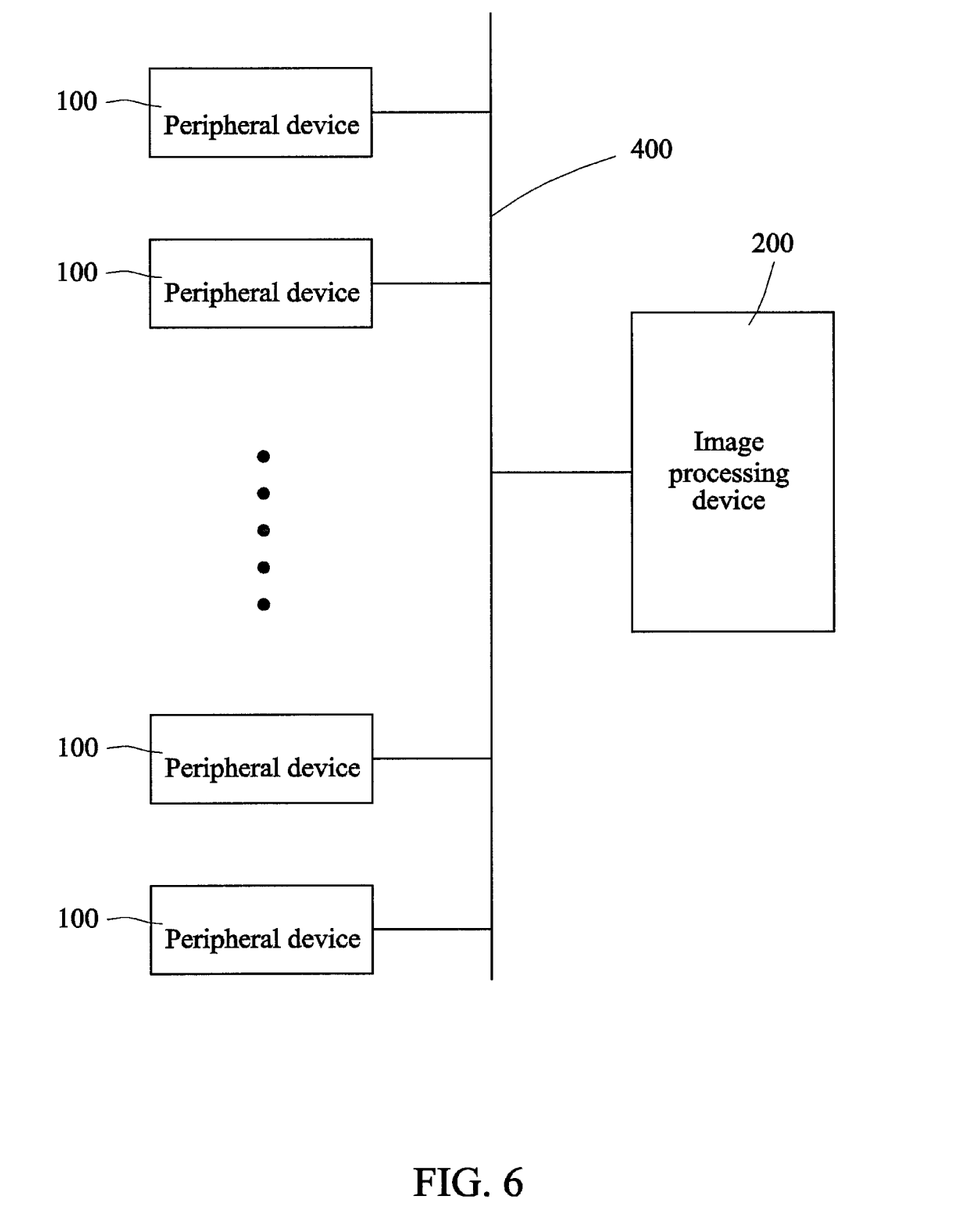
FIG. 6 is a schematic view showing a copy system according to the preferred embodiment of this disclosure.

FIG. 6 is a schematic view showing a copy system according to the preferred embodiment of this disclosure. As shown in FIG. 6, multiple peripheral devices 100 are connected to the image processing device 200 (may be regarded as a cloud server) through the network 400, and the copy operation of each peripheral device 100 is controlled and recorded by the image processing device 200, so that the copy processes with the copy history records can be implemented in the office or organization. It is also possible to judge whether the calibration direction CD and the calibration distance CM exceed the normal ranges or not, and to automatically notify the abnormal state of the machine if the normal range is exceeded, so that the maintenance man may have the maintenance.

Figure 7:
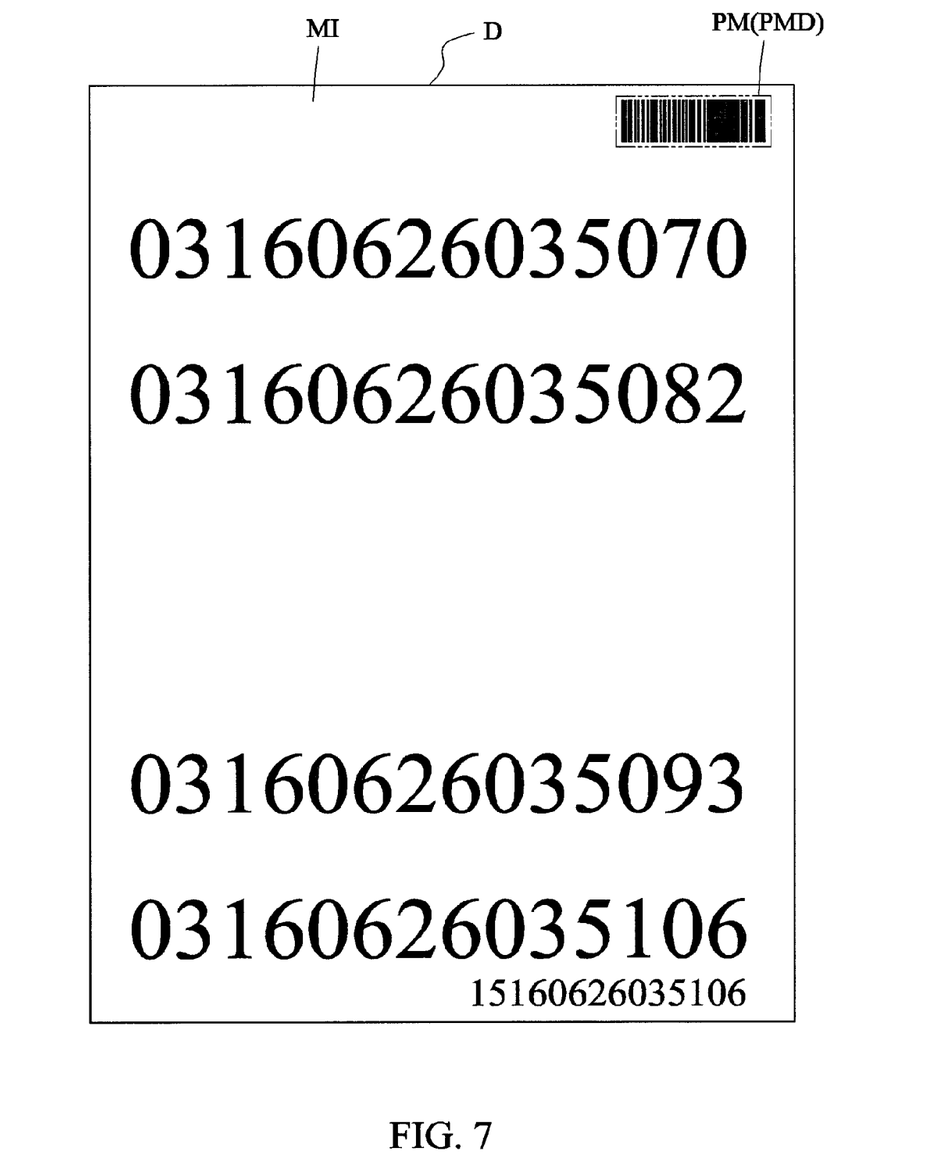
FIG. 7 is a schematic view showing another original document according to a third embodiment of this disclosure.
Figure 8:
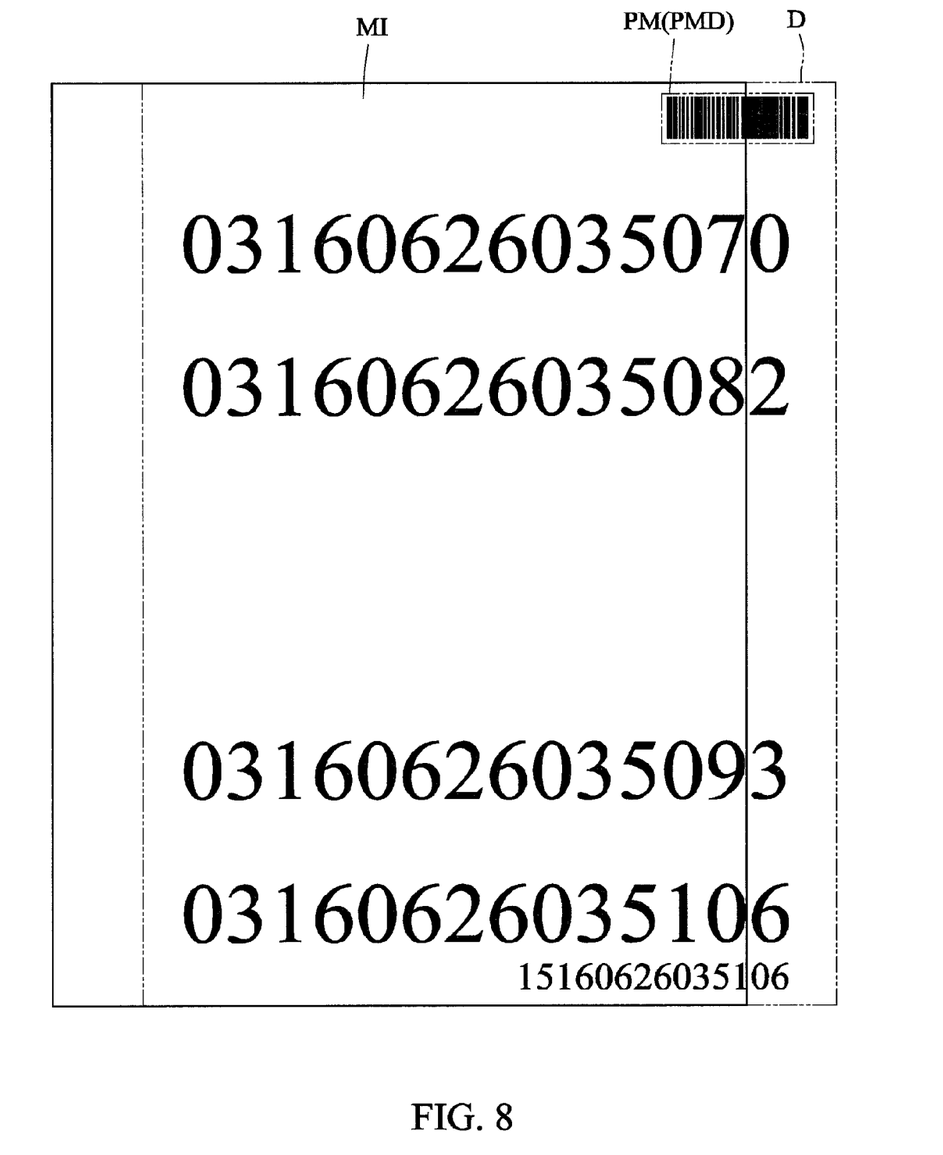
FIG. 8 is a schematic view showing the another original document being scanned according to the third embodiment of this disclosure.
Figure 9:
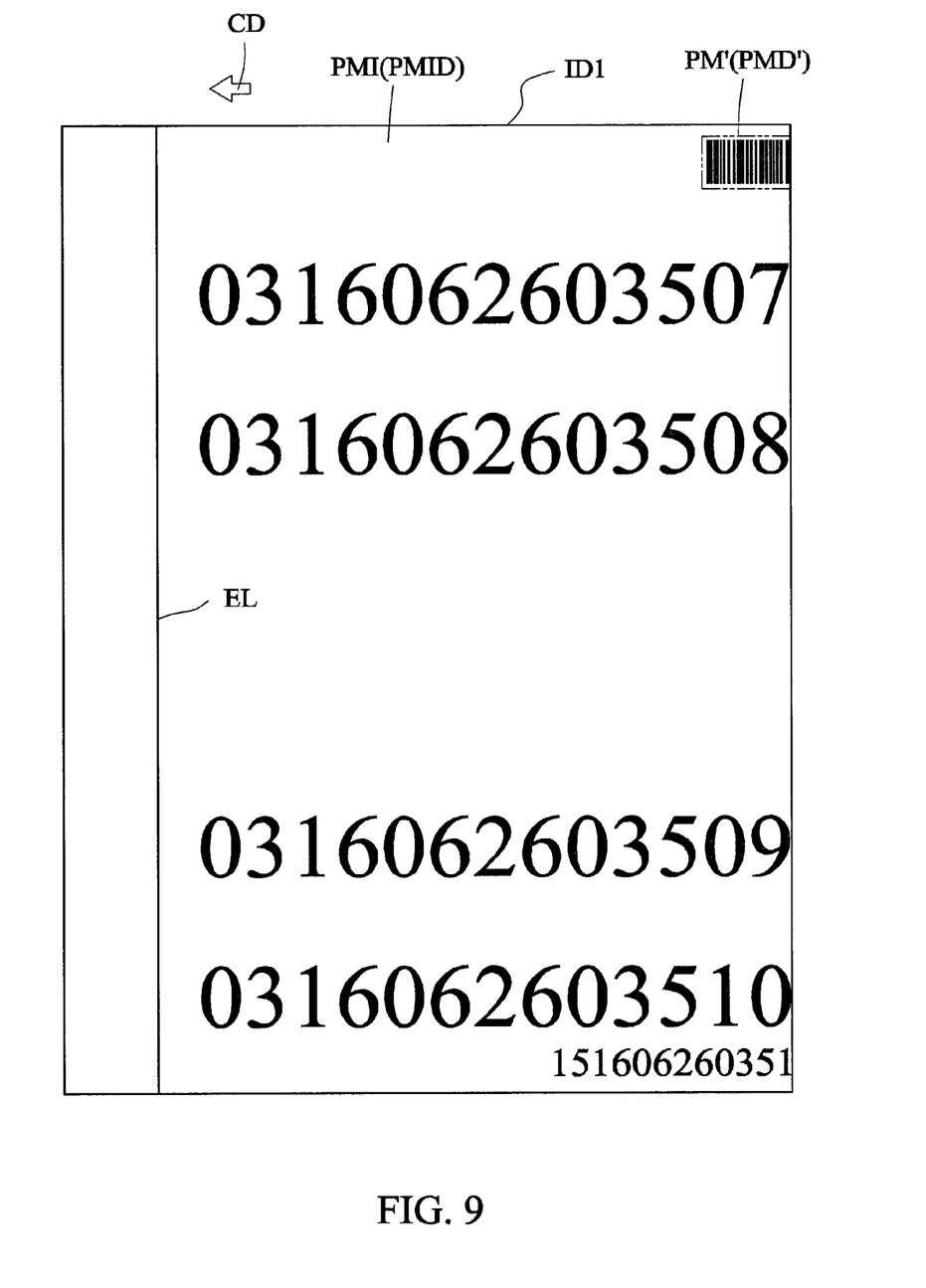
FIGS. 9 and 10 are schematic views showing processes of generating the new image data according to the third embodiment of this disclosure.
Figure 10:
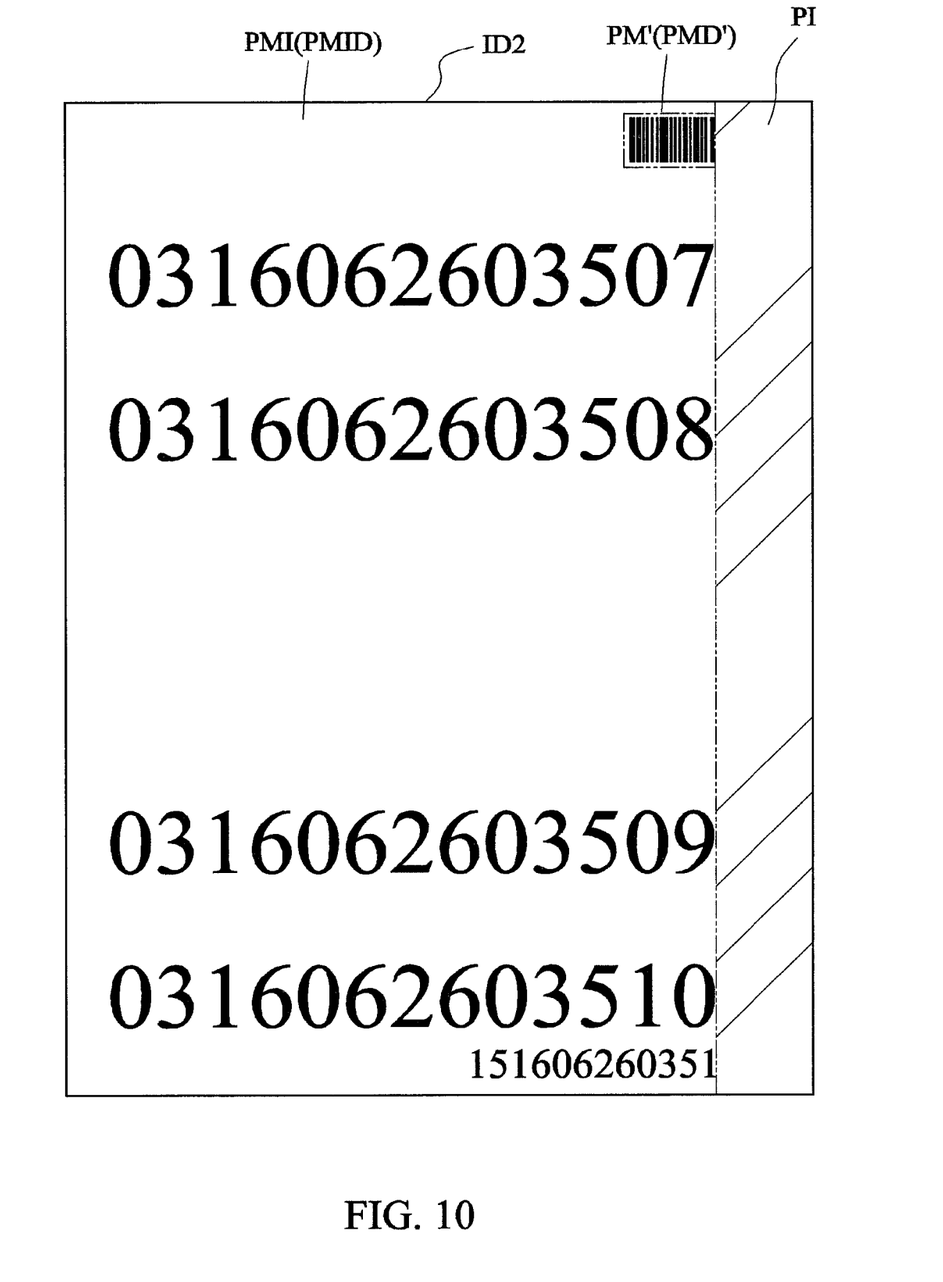

As shown in FIGS. 7 to 10, the third embodiment is similar to the first embodiment except for the difference that the positioning mark PM of the document D of FIG. 7 is a bar code, and only the right side portion of FIG. 8 is not scanned when the document D is being scanned. Thus, the partial main image data PMID of FIG. 9 is generated. Finally, the partial main image PMI (old image data ID1) is shifted leftward to generate the new image data ID2 of FIG. 10. The positioning mark data PMD' of this embodiment represents the image of a portion PM' of the positioning mark PM. That is, the positioning mark PM is even not completely scanned. Because the longitudinal bar code pattern is used in this embodiment, the calibration distance and the calibration direction still can be determined according to any point (e.g., the lower left corner of the portion PM' of FIG. 9) of the scanned bar code even when the data gets partially lost. Thus, it is unnecessary to use four positioning marks at four corners of the document to achieve the calibration function. In addition, the left-side edge line EL of FIG. 9 also disappears due to the image shifting. Because a portion of the bar code pattern may be removed in the subsequent processing, or replaced with a complete bar code pattern, the lost bar code pattern can be accepted in the following conditions. For example, the bar code is re-encoded to generate a new bar code pattern according to the old bar code pattern, wherein the new bar code pattern contains new generation-count information representing that the reproduced or copied result is a third generation of reproduced document generated from the second generation of reproduced document, or contains the information of the copier (person), the copy date information, the copy count information or the like. The generation-count information is preferably placed near the middle portion and cannot easily get lost upon image acquiring or copying.

In addition, the embodiment of this disclosure also provides a copy method used in a copy system or a copy apparatus. The copy method comprises the following steps. First, the document D is scanned to obtain the old image data ID1, which has the partial positioning mark data PMD' corresponding to the portion PM' of the positioning mark PM of the document D, and the partial main image data PMID corresponding to the partial main image PMI of a portion of the main image MI of the document D. Then, the partial main image PMI is shifted by a calibration distance CM in a calibration direction CD to a standard position of a typesetting page according to the partial positioning mark data PMD' and the partial main image data PMID. Next, a predetermined image PI is added to one side or neighboring two sides of the partial main image PMI to generate the new image data ID2, wherein the calibration direction CD is contained in directions from the predetermined image PI to the positioning mark PM. Then, the new image data ID2 is printed on a medium M or outputted to another device.

With the above-mentioned embodiments, the position-shifted image of the original can be pulled back to the normal position while the lost image caused by pulling back can be filled with a new image when the original is being copied. Thus, one stack of reproduced documents may have substantially the same typesetting pages to satisfy the neat requirement without damaging the important data. More particularly, when this stack of reproduced documents is bound into a book with three blank side portions being cut off, the user may feel the consistency of the bound pages of the book without the messy feeling when the user continuously turns over the pages.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. An image processing device, comprising:
    a receiving port receiving old image data from a peripheral device, the old image data having partial positioning mark data corresponding to a portion of a positioning mark of a document, and partial main image data corresponding to a partial main image of a portion of a main image of the document;
    a processor electrically connected to the receiving port, wherein the processor shifts the partial main image by a calibration distance in a calibration direction to a standard position of a typesetting page according to the partial positioning mark data and the partial main image data, and adds a predetermined image to one side or neighboring two sides of the partial main image to generate new image data, wherein the calibration direction is contained in directions from the predetermined image to the positioning mark; and
    an output port, which is electrically connected to the processor and outputs the new image data.

2. The image processing device according to claim 1, wherein the processor further outputs the new image data to the peripheral device through the output port.

3. The image processing device according to claim 1, wherein the processor determines the calibration direction and the calibration distance according to the partial positioning mark data.

4. The image processing device according to claim 1, further comprising a storage, which is electrically connected to the processor, and stores standard position data corresponding to standard positions of multiple sets of template mark data comprising the partial positioning mark data.

5. The image processing device according to claim 4, wherein the processor finds the standard position data of the partial positioning mark data from the multiple sets of template mark data, and determines the calibration direction and the calibration distance according to the standard position data and the partial positioning mark data.

6. The image processing device according to claim 1, wherein the predetermined image comprises an image selected from a group consisting of a blank image, a gray image and a text image.

7. A copy apparatus, comprising:
a peripheral device scanning a document to obtain old image data, wherein the old image data has partial positioning mark data corresponding to a portion of a positioning mark of the document, and partial main image data corresponding to a partial main image of a portion of a main image of the document; and
an image processing device, which is connected to the peripheral device, receives the old image data, shifts the partial main image by a calibration distance in a calibration direction to a standard position of a typesetting page according to the partial positioning mark data and the partial main image data, and adds a predetermined image to one side or neighboring two sides of the partial main image to generate new image data, wherein the calibration direction is contained in directions from the predetermined image to the positioning mark, and the peripheral device further receives the new image data and prints the new image data on a medium.

8. The copy apparatus according to claim 7, wherein the image processing device determines the calibration direction and the calibration distance according to the partial positioning mark data.

9. The copy apparatus according to claim 7, wherein the image processing device further stores standard position data corresponding to standard positions of multiple sets of template mark data comprising the partial positioning mark data.

10. The copy apparatus according to claim 9, wherein the image processing device finds the standard position data of the partial positioning mark data from the multiple sets of template mark data, and determines the calibration direction and the calibration distance according to the standard position data and the partial positioning mark data.

11. The copy apparatus according to claim 7, wherein the predetermined image comprises an image selected from a group consisting of a blank image, a gray image and a text image.

12. The copy apparatus according to claim 7, wherein only partial images of the document and the medium are the same.

13. A copy method used in a copy system or a copy apparatus, the copy method comprising steps of:
scanning a document to obtain old image data, wherein the old image data has partial positioning mark data corresponding to a portion of a positioning mark of the document, and partial main image data corresponding to a partial main image of a portion of a main image of the document;
shifting the partial main image by a calibration distance in a calibration direction to a standard position of a typesetting page according to the partial positioning mark data and the partial main image data;
adding a predetermined image to one side or neighboring two sides of the partial main image to generate new image data, wherein the calibration direction is contained in directions from the predetermined image to the positioning mark; and
printing the new image data on a medium.

14. The copy method according to claim 13, wherein the calibration direction and the calibration distance are determined according to the partial positioning mark data.

15. The copy method according to claim 13, wherein the copy system or the copy apparatus stores standard position data corresponding to standard positions of multiple sets of template mark data comprising the partial positioning mark data, and the copy method further comprises steps of:
finding the standard position data of the partial positioning mark data from the multiple sets of template mark data; and
determining the calibration direction and the calibration distance according to the standard position data and the partial positioning mark data.

* * * * *